United States Patent
Zhang et al.

(10) Patent No.: US 10,387,035 B2
(45) Date of Patent: Aug. 20, 2019

(54) ELECTRONIC DEVICE AND METHOD FOR CONTROLLING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhao-Ping Zhang, Shenzhen (CN); Chih-San Chiang, New Taipei (TW); Hui-Gang He, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 20 days.

(21) Appl. No.: 15/633,767

(22) Filed: Jun. 27, 2017

(65) Prior Publication Data
US 2017/0371538 A1    Dec. 28, 2017

(30) Foreign Application Priority Data

Jun. 28, 2016    (CN) .......................... 2016 1 0496755

(51) Int. Cl.
*G06F 3/0489*    (2013.01)
*G06F 3/0482*    (2013.01)
*G06F 3/0488*    (2013.01)

(52) U.S. Cl.
CPC ........ *G06F 3/04897* (2013.01); *G06F 3/0482* (2013.01); *G06F 3/04886* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,564,170 | B2* | 5/2003 | Halabieh | G06F 9/451 |
| | | | | 702/181 |
| 6,757,001 | B2* | 6/2004 | Allport | G06F 1/1626 |
| | | | | 345/184 |
| 9,244,583 | B2* | 1/2016 | Lovitt | G06F 3/0481 |
| 9,690,450 | B2* | 6/2017 | Satterfield | G06F 3/0481 |
| 2009/0319462 | A1* | 12/2009 | Tirpak | G06F 9/451 |
| | | | | 706/47 |
| 2013/0152001 | A1* | 6/2013 | Lovitt | G06F 3/0482 |
| | | | | 715/765 |
| 2013/0326413 | A1* | 12/2013 | Croft | G06F 3/0481 |
| | | | | 715/811 |
| 2013/0346905 | A1* | 12/2013 | Do | G06F 17/276 |
| | | | | 715/773 |
| 2016/0241784 | A1* | 8/2016 | Baek | G06F 1/3287 |

FOREIGN PATENT DOCUMENTS

CN    102662432 A    9/2012

* cited by examiner

*Primary Examiner* — Hien L Duong
(74) *Attorney, Agent, or Firm* — ScienBiziP, P.C.

(57) ABSTRACT

A method for controlling an electronic device includes determining a software application that is running in the electronic device. Pressing information in relation to a predetermined physical button of the electronic device is detected and a probability of use of each of buttons corresponding to the software application is obtained by searching a preset list according to the software application. An operation is performed according to the pressing information and the probability of use of each of buttons corresponding to the software application.

15 Claims, 5 Drawing Sheets

ELECTRONIC DEVICE AND METHOD FOR CONTROLLING THE SAME

CROSS-REFERENCE TO RELATED APPLICATIONS

This application claims priority to Chinese Patent Application No. 201610496755.4 filed on Jun. 28, 2016, the contents of which are incorporated by reference herein.

FIELD

The subject matter herein generally relates to control technology, and particularly to an electronic device and a method for controlling the electronic device.

BACKGROUND

An electronic device such as a mobile phone may include a plurality of physical buttons (e.g., a power button and a volume button) and a plurality of virtual buttons. However, if the mobile phone has a big size, a user may need two hands to operate the mobile phone, so as to be able to press the physical buttons and the virtual buttons.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
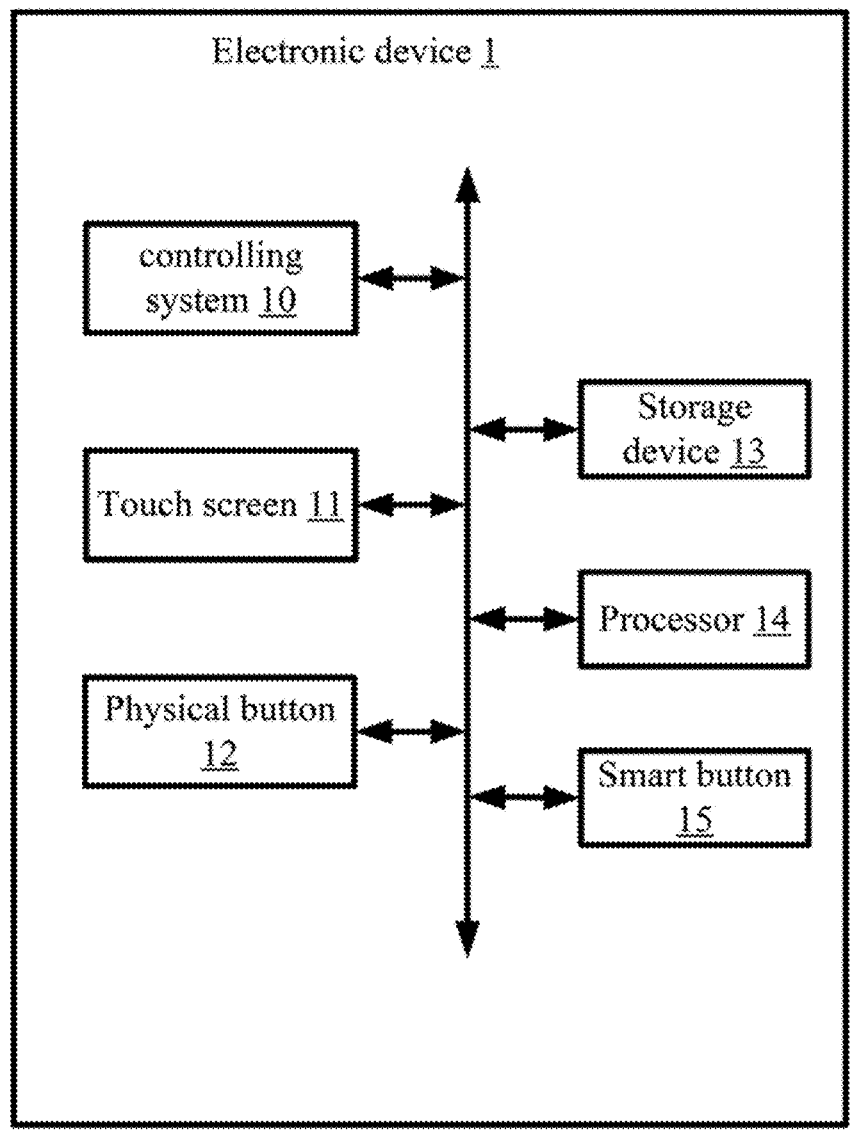
FIG. 1 is a block diagram of one exemplary embodiment of an electronic device including a controlling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 can include, but is not limited to, a controlling system 10, a touch screen 11, at least one physical button 12, a storage device 13, and at least one processor 14. In at least one exemplary embodiment, the electronic device 1 can be a mobile phone, a tablet computer, a personal digital assistant, or any other suitable device such as a smart television. FIG. 1 illustrates only one example of the electronic device 1, other examples can include more or fewer components than as illustrated, or have a different configuration of the various components in other exemplary embodiments.

In at least one exemplary embodiment, the touch screen 11 can be liquid crystal display (LCD), or an organic light-emitting diode (OLED). The touch screen 11 can detect touch events generated at one or more positions on the touch screen 11. For example, the touch screen 11 can detect a touch, which position corresponds to the touch, and whether a touch path or track is generated. The electronic device 1 can include a number of software applications. The number of software applications can include, but are not limited to, a music player application, an image processing application, an image preview application, and an instant communication application. The touch screen 11 can display one or more virtual buttons for operating the software application when the software application is running.

In at least one exemplary embodiment, the at least one physical button 12 can include, but is not limited to, a power button, a volume button, and a home button. In at least one exemplary embodiment, the electronic device 1 can further include a smart button 15. In at least one exemplary embodiment, the smart button 15 can be a physical button. In at least one exemplary embodiment, the smart button 15 can be one of the at least one physical button 12. In other exemplary embodiments, the smart button 15 can be a physical button that is newly configured on the electronic device 1. In at least one exemplary embodiment, the smart button 15 can be a physical key configured on the electronic device 1, and the smart button 15 can be integrated with all of functions of the power button and the volume button, and can be further integrated with all of functions of the one or more virtual buttons used for operating the software application. In other words, the smart button 15 can be used to perform all the functions of the power button, the volume button, and the one or more virtual buttons.

In other exemplary embodiments, the smart button 15 can be integrated with the functions of the one or more virtual buttons only.

In at least one exemplary embodiment, the storage device 13 can be a memory of the electronic device 1. In other exemplary embodiments, the storage device 13 can be a secure digital card, or other external storage device such as a smart media card. The storage device 13 can be used to store data of the electronic device 1.

In at least one exemplary embodiment, the controlling system 10 can pre-store a list that lists a probability of use of each of all the buttons corresponding to each software application in the storage device 13, i.e., the list records a relationship between the probability of use and each of the buttons corresponding to each software application. The buttons corresponding to each software application can be defined as the buttons used for operating each software application, and the buttons can include the physical button and/or the virtual button. For example, when the software application is the music play application, the buttons corresponding to the music play application can include a number of virtual buttons and the volume button which is the physical button configured on the electronic device 1. The number of virtual buttons can include, but are not limited to, a pause/start button, a next button, a previous button, and a return button. In at least one exemplary embodiment, the probability of use of each button can be defined as the probability of the each button used in a predetermined time period. In at least one exemplary embodiment, the probability of use of the each button equals a value that is obtained by dividing the predetermined time period by a number of times each button is used in the predetermined time period.

In at least one exemplary embodiment, the controlling system 10 can obtain the list using machine learning algorithms. In at least one exemplary embodiment, the controlling system 10 obtains the list by analyzing a lot of data regarding the use of the smart button 15. The controlling system 10 can automatically update the list according to actual use of the smart button 15. In other exemplary embodiments, the list may be preset by a programmer who programs the controlling system 10 according to own experience.

The at least one processor 14 can be a central processing unit (CPU), a microprocessor, or other data processor chip that performs functions of the electronic device 1.

Figure 2:
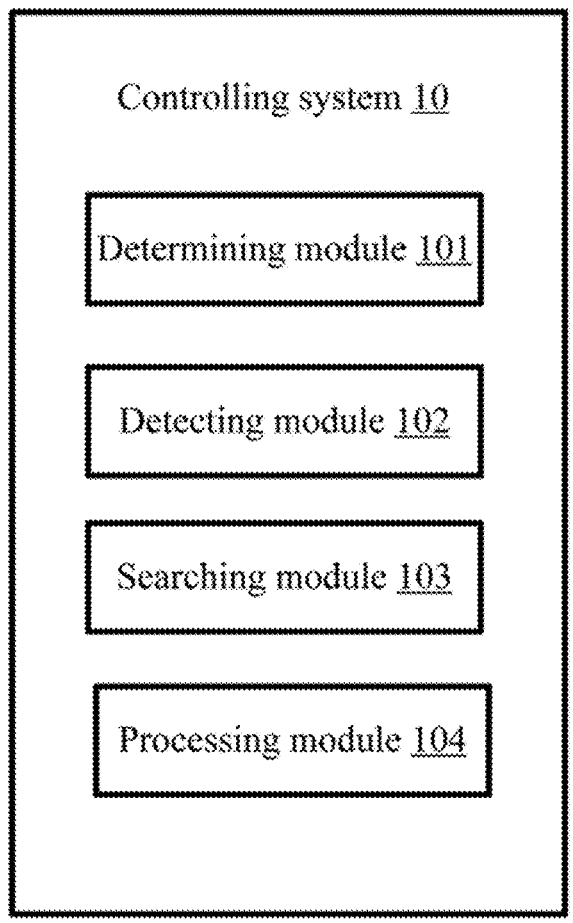
FIG. 2 is a block diagram of one exemplary embodiment of modules of the controlling system of FIG. 1.

FIG. 2 illustrates a block diagram of one exemplary embodiment of modules of the controlling system 10. In at least one exemplary embodiment, the controlling system 10 can include an determining module 101, a detecting module 102, a searching module 103, and a processing module 104. The modules 101-104 include computerized codes in the form of one or more programs that may be stored in the storage device 13. The computerized codes include instructions that can be executed by the at least one processor 14.

Figure 3:
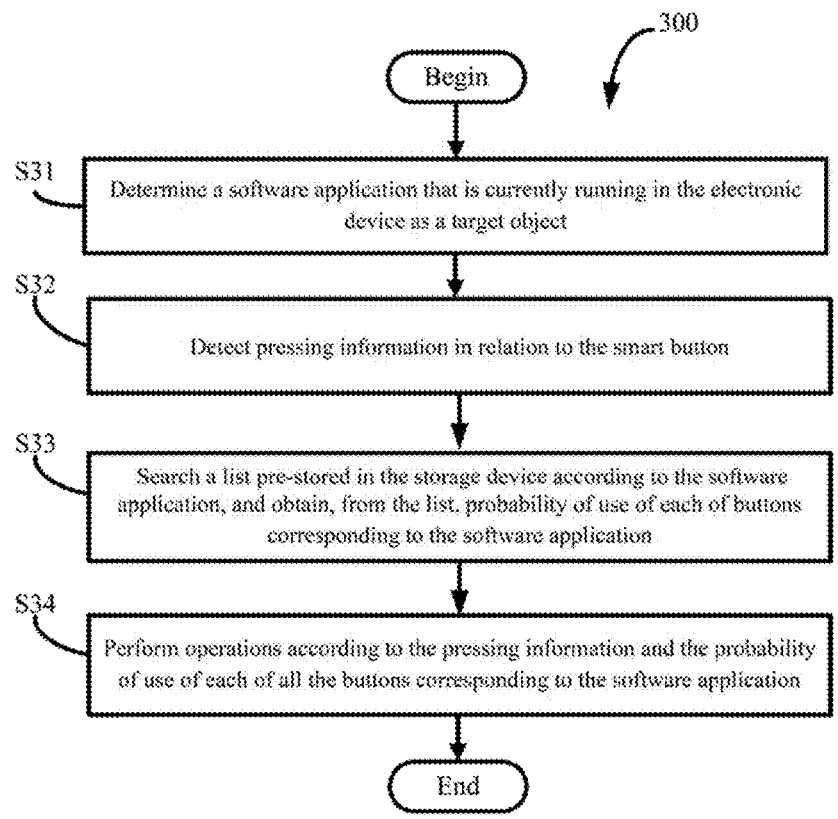
FIG. 3 illustrates a flow chart of one exemplary embodiment of a method for controlling the electronic device of FIG. 1.

FIG. 3 illustrates a flowchart which is presented in accordance with an example embodiment. The exemplary method 300 is provided by way of example, as there are a variety of ways to carry out the method. The method 300 described below can be carried out using the configurations illustrated in FIG. 1, for example, and various elements of these figures are referenced in explaining exemplary method 300. Each block shown in FIG. 3 represents one or more processes, methods, or subroutines, carried out in the exemplary method 300. Additionally, the illustrated order of blocks is by example only and the order of the blocks can be changed according to the present disclosure. The exemplary method 300 can begin at block S31. Depending on the embodiment, additional steps can be added, others removed, and the ordering of the steps can be changed.

At block S31, the determining module 101 can determine a software application that is currently running in the electronic device 1 as an object to be controlled (hereinafter "target object").

In at least one exemplary embodiment, when the touch screen 11 displays a number of user interfaces, each of which corresponds to a software application, the determining module 101 can determine that the software application which corresponds to the user interface currently displayed on the outermost layer as the target object. In other exemplary embodiments, when only one user interface is displayed on the touch screen 11, the determining module 101 can determine that the software application which corresponds to the user interface as the target object.

At block S32, the detecting module 102 can detect pressing information in relation to the smart button 15.

In at least one exemplary embodiment, data as to the pressing information can include, but is not limited to, a short press of the smart button 15, a long press, and a double press of the smart button 15. In at least one exemplary embodiment, the long press can be defined as pressing the smart button 15 for more than a predetermined time duration (e.g., two seconds), and the short press can be defined as pressing the smart button 15 less than or equal to the predetermined time duration. In at least one exemplary embodiment, the double press can be defined as the smart button 15 is pressed two times in a preset time period (for example, 2 seconds).

At block S33, the searching module 102 can search the list pre-stored in the storage device 13 according to the software application (i.e., the target object), and obtain, from the list, the probability of use of each of all the buttons corresponding to the software application (i.e., the target object).

At block S34, the processing module 104 can perform operations according to the pressing information and the probability of use of each of all the buttons corresponding to the software application (i.e., the target object).

In at least one exemplary embodiment, the processing module 104 can perform operations according to the pressing information only. In other exemplary embodiments, the processing module 104 can perform operations according to the pressing information and the probability of use of each of the buttons corresponding to the software application.

In at least one exemplary embodiment, when the pressing information indicates that the smart button 15 is short pressed, the processing module 104 can perform operations according to the probability of use of each of all the buttons corresponding to the software application. When the pressing information indicates that the smart button 15 is long pressed, the processing module 104 can display all the buttons corresponding to the software application. When the pressing information indicates that the smart button 15 is double pressed, the processing module 104 can perform an operation corresponding to a preset button, e.g., the home button.

In at least one exemplary embodiment, when the pressing information indicates that the smart button 15 is short pressed, and a difference between the probability of use of one particular button corresponding to the software application and the probability of use of each of other buttons corresponding to the software application is greater than a first preset value (e.g., 0.5), the processing module 104 can perform an operation corresponding to the one particular button. For example, four buttons (e.g., E1, E2, E3, and E4) correspond to the software application. The probability of use of E1 button equals 0.9, the probability of use of E2 button equals 0.05, the probability of use of E3 button equals 0.03, and the probability of use of E4 button equals 0.02. That is, the difference between the probability of use of the E1 button and the probability of use of each of the other buttons (i.e., E2, E3, and E4) is greater than the first preset value, thus the processing module 104 performs the operation corresponding to the E1 button.

Figure 4:
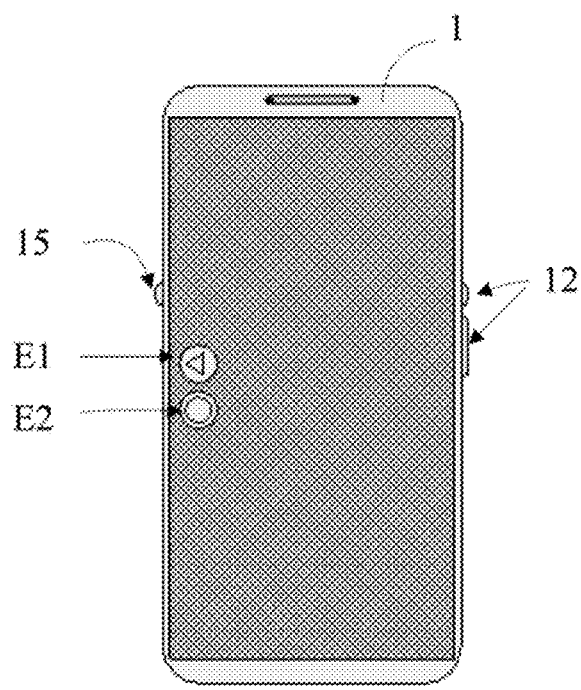
FIG. 4 illustrates a first exemplary embodiment of displaying buttons on a touch screen of the electronic device of FIG. 1.

In at least one exemplary embodiment, when the pressing information indicates that the smart button 15 is short pressed, and a difference between the probability of use of one particular button corresponding to the software application and the probability of use of at least one of other buttons corresponding to the software application is greater than a second preset value (e.g., 0.3), the processing module 104 can display the one particular button on the touch screen 11. For example, four buttons (E1, E2, E3, and E4) correspond to the software application. The probability of use of E1 button equals 0.5, the probability of use of E2 button equals 0.4, the probability of use of E3 button equals 0.03, and the probability of use of E4 button equals 0.07. That is, the difference between the probability of use of the E1 button and the probability of use of the E3 or of the E4 button is greater than the second preset value. The difference between the probability of use of the E2 button and the probability of use of the E3 or E4 button is greater than the second preset value. The processing module 104 can thus display the E1 button and the E2 button on the touch screen 11, as shown in FIG. 4.

In at least one exemplary embodiment, when not all of the buttons corresponding to the software application are displayed on the touch screen 11 according to the probability of use of each of all the buttons corresponding to the software application, and when the detecting module 104 in this case further detects the short press of the smart button 15, the processing module 104 can determine that the currently displayed buttons are not wanted by a user. The processing module 104 can display all of the buttons corresponding to the software application on the touch screen 11 in response to the further detecting of the short press of the smart button 15.

Figure 5:
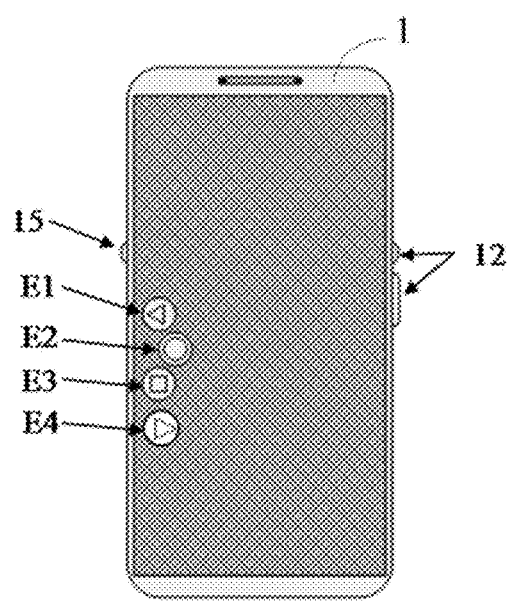
FIG. 5 illustrates a second exemplary embodiment of displaying buttons on the touch screen of the electronic device of FIG. 1.

In at least one exemplary embodiment, when the pressing information indicates that the smart button 15 is short pressed, and the difference between the probability of use of each two of all the buttons corresponding to the software application is less than a third preset value (e.g., 0.1), the processing module 104 can display all the buttons corresponding to the software application on the touch screen 11. For example, four buttons (e.g., E1, E2, E3, and E4) are corresponding to the software application. The probability of use of E1 button equals 0.3, the probability of use of E2 button equals 0.35, the probability of use of E3 button equals 0.2, and the probability of use of E4 button equals 0.15. That is, the difference between each two of the four buttons is less than the third value. Then the processing module 104 can display all of the four buttons on the touch screen 11 as shown in FIG. 5.

In other exemplary embodiments, the processing module 104 can preset relationships between the pressing information and buttons corresponding to the software application. Then the processing module 104 can control the software application according to the pressing information received by the detecting module 102. For example, it is assumed that the software application is an image capturing application. When the processing module 104 presets a relationship between the double press of the smart button 15 and a home button, the processing module 104 can, in response to the double press of the smart button 15, control the image capturing application to exit a current interface of the image capturing application, and control the touch screen 11 to display a home page of the electronic device 1. When the processing module 104 presets a relationship between the long press of the smart button 15 and a button for continuous shooting of the image capturing application, the processing module 104 can, in response to the long press of the smart button 15, control the image capturing application to shoot continuously. When the processing module 104 presets a relationship between the short press of the smart button 15 and a button for one image capture by the image capturing application, the processing module 104 can, in response to the short press of the smart button 15, control the image capturing application to capture one image.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for controlling an electronic device, the method comprising:
    determining a software application that is running in the electronic device;
    detecting pressing information in relation to a predetermined physical button of the electronic device;
    obtaining a probability of use of each of buttons corresponding to the software application by searching a preset list according to the software application, wherein the buttons corresponding to the software application are used for operating the software application, wherein the preset list records the probability of use of each of the buttons corresponding to the software application;
    performing an operation according to the pressing information and the probability of use of each of the buttons corresponding to the software application; and
    wherein the operation is performed by displaying all the buttons corresponding to the software application on a touch screen when the pressing information indicates that the predetermined physical button is pressed for a long time.

2. The method according to claim 1, wherein the pressing information comprises short press of the predetermined physical button, long press of the predetermined physical button, and double press of the predetermined physical button.

3. The method according to claim 1, wherein the operation is performed according to the probability of use of each of buttons corresponding to the software application when the pressing information indicates that the predetermined physical button is short pressed; and the operation is performed by performing an operation corresponding to a preset button when the pressing information indicates that the predetermined physical button is double pressed.

4. The method according to claim 3, wherein when the pressing information indicates that the predetermined physical button is short pressed, and a difference between the probability of use of one particular button corresponding to the software application and the probability of use of each of other buttons corresponding to the software application is greater than a first preset value, the electronic device performs an operation corresponding to the one particular button;

when the pressing information indicates that the predetermined physical button is short pressed, and a difference between the probability of use of one particular button corresponding to the software application and the probability of use of at least one of other buttons corresponding to the software application is greater than a second preset value, the electronic device displays the one particular button on the touch screen;

when the pressing information indicates that the predetermined physical button is short pressed, and a difference between the probability of use of each two of all the buttons corresponding to the software application is less than a third preset value, the electronic device displays all the buttons corresponding to the software application on the touch screen.

5. The method according to claim 4, when not all of the buttons corresponding to the software application are displayed on the touch screen according to the probability of use of each of all the buttons corresponding to the software application, the electronic device determines that the displayed buttons are not wanted by a user in response to further detecting of the short press of the predetermined physical button, and displays all of the buttons corresponding to the software application on the touch screen.

6. An electronic device comprising:
a touch screen;
a storage device;
at least one processor; and
the storage device storing one or more programs, which when executed by the at least one processor, cause the at least one processor to:
determine a software application that is running in the electronic device;
detect pressing information in relation to a predetermined physical button of the electronic device;
obtain a probability of use of each of buttons corresponding to the software application by searching a preset list according to the software application, wherein the buttons corresponding to the software application are used for operating the software application, wherein the preset list records the probability of use of each of the buttons corresponding to the software application;
perform an operation according to the pressing information and the probability of use of each of the buttons corresponding to the software application; and
wherein the operation is performed by displaying all the buttons corresponding to the software application on a touch screen when the pressing information indicates that the predetermined physical button is pressed for a long time.

7. The electronic device according to claim 6, wherein the pressing information comprises short press of the predetermined physical button, long press of the predetermined physical button, and double press of the predetermined physical button.

8. The electronic device according to claim 6, wherein the operation is performed according to the probability of use of each of buttons corresponding to the software application when the pressing information indicates that the predetermined physical button is short pressed; and the operation is performed by performing an operation corresponding to a preset button when the pressing information indicates that the predetermined physical button is double pressed.

9. The electronic device according to claim 8, wherein when the pressing information indicates that the predetermined physical button is short pressed, and a difference between the probability of use of one particular button corresponding to the software application and the probability of use of each of other buttons corresponding to the software application is greater than a first preset value, the at least one processor performs an operation corresponding to the one particular button;

when the pressing information indicates that the predetermined physical button is short pressed, and a difference between the probability of use of one particular button corresponding to the software application and the probability of use of at least one of other buttons corresponding to the software application is greater than a second preset value, the at least one processor displays the one particular button on the touch screen;

when the pressing information indicates that the predetermined physical button is short pressed, and a difference between the probability of use of each two of all the buttons corresponding to the software application is less than a third preset value, the at least one processor displays all the buttons corresponding to the software application on the touch screen.

10. The electronic device according to claim 9, when not all of the buttons corresponding to the software application are displayed on the touch screen according to the probability of use of each of all the buttons corresponding to the software application, the at least one processor determines that the displayed buttons are not wanted by a user in response to further detecting of the short press of the predetermined physical button, and displays all of the buttons corresponding to the software application on the touch screen.

11. A non-transitory storage medium having stored thereon instructions that, when executed by a processor of an electronic device, causes the processor to perform a controlling method, wherein the method comprises:
determining a software application that is running in the electronic device;
detecting pressing information in relation to a predetermined physical button of the electronic device;
obtaining a probability of use of each of buttons corresponding to the software application by searching a preset list according to the software application, wherein the buttons corresponding to the software application are used for operating the software application, wherein the preset list records the probability of use of each of the buttons corresponding to the software application;
performing an operation according to the pressing information and the probability of use of each of the buttons corresponding to the software application; and
wherein the operation is performed by displaying all the buttons corresponding to the software application on a touch screen when the pressing information indicates that the predetermined physical button is pressed for a long time.

12. The non-transitory storage medium according to claim 11, wherein the pressing information comprises short press of the predetermined physical button, long press of the predetermined physical button, and double press of the predetermined physical button.

13. The non-transitory storage medium according to claim 11, wherein the operation is performed according to the probability of use of each of buttons corresponding to the software application when the pressing information indicates that the predetermined physical button is short pressed; and the operation is performed by performing an operation corresponding to a preset button when the pressing information indicates that the predetermined physical button is double pressed.

14. The non-transitory storage medium according to claim 13, wherein when the pressing information indicates that the predetermined physical button is short pressed, and a difference between the probability of use of one particular button corresponding to the software application and the probability of use of each of other buttons corresponding to the software application are greater than a first preset value, the electronic device performs an operation corresponding to the one particular button;

when the pressing information indicates that the predetermined physical button is short pressed, and a difference between the probability of use of one particular e button corresponding to the software application and the probability of use of at least one of other buttons corresponding to the software application is greater than a second preset value, the electronic device displays the one particular button on the touch screen;

when the pressing information indicates that the predetermined physical button is short pressed, and a difference between the probability of use of each two of all the buttons corresponding to the software application is less than a third preset value, the electronic device displays all the buttons corresponding to the software application on the touch screen.

15. The non-transitory storage medium according to claim 14, when not all of the buttons corresponding to the software application are displayed on the touch screen according to the probability of use of each of all the buttons corresponding to the software application, the electronic device determines that the displayed buttons are not wanted by a user in response to further detecting of the short press of the predetermined physical button, and displays all of the buttons corresponding to the software application on the touch screen.

* * * * *